United States Patent [19]

Kawamura et al.

[11] Patent Number: 5,821,997

[45] Date of Patent: Oct. 13, 1998

[54] STILL IMAGE RECORDING APPARATUS WHICH SELECTIVELY COMPRESSES SINGLE IMAGE INFORMATION AT A FIRST COMPRESSION RATIO AND A SECOND COMPRESSION RATIO AND TO DECOMPRESS THE COMPRESSED SINGLE IMAGE INFORMATION FOR DISPLAY BEFORE MAIN STORAGE

[75] Inventors: Koichiro Kawamura, Chiba-ken; Masahiro Suzuki, Kawasaki, both of Japan

[73] Assignee: Nikon Corporation, Tokyo, Japan

[21] Appl. No.: 863,622

[22] Filed: May 27, 1997

Related U.S. Application Data

[63] Continuation of Ser. No. 422,769, Apr. 14, 1995, abandoned, which is a continuation of Ser. No. 107,312, Aug. 17, 1993, abandoned.

[30] Foreign Application Priority Data

Sep. 10, 1992 [JP] Japan ..................................... 4-266877

[51] Int. Cl.[6] .............................. H04N 5/76; H04N 7/12; G06K 9/36; G06K 9/46
[52] U.S. Cl. .......................... 348/131; 348/399; 382/233; 386/109
[58] Field of Search ..................................... 382/232, 234, 382/233; 348/207, 220, 231, 233, 397, 399–401, 404, 405, 222, 229, 569, 568, 588, 209, 329; 358/906, 909.1, 451, 426; 386/109, 112, 117

[56] References Cited

U.S. PATENT DOCUMENTS

| | | | |
|---|---|---|---|
| 4,930,014 | 5/1990 | Maeda et al. ........................... | 358/209 |
| 4,941,042 | 7/1990 | Martens .................................. | 358/133 |
| 5,001,561 | 3/1991 | Haskel .................................... | 348/400 |
| 5,027,214 | 6/1991 | Fujimori ................................. | 348/233 |
| 5,028,995 | 7/1991 | Igawa et al. ............................ | 358/105 |
| 5,032,927 | 7/1991 | Watanabe et al. ...................... | 348/403 |
| 5,068,724 | 11/1991 | Krause et al. .......................... | 358/133 |
| 5,164,831 | 11/1992 | Kuchata et al. ........................ | 348/233 |

*Primary Examiner*—Bipin Shalwala

[57] ABSTRACT

A still image recording apparatus for compressing and storing image information comprises a compression unit for compressing the same image information at a plurality of different compression ratios, and a memory for storing the image data compressed by the compression unit at the different compression ratios, collectively. It further comprises a selector for setting a combination of compression ratios to the compression unit. The selector selects the combination of compression ratios based on a degree of complexity of the input image information.

26 Claims, 7 Drawing Sheets

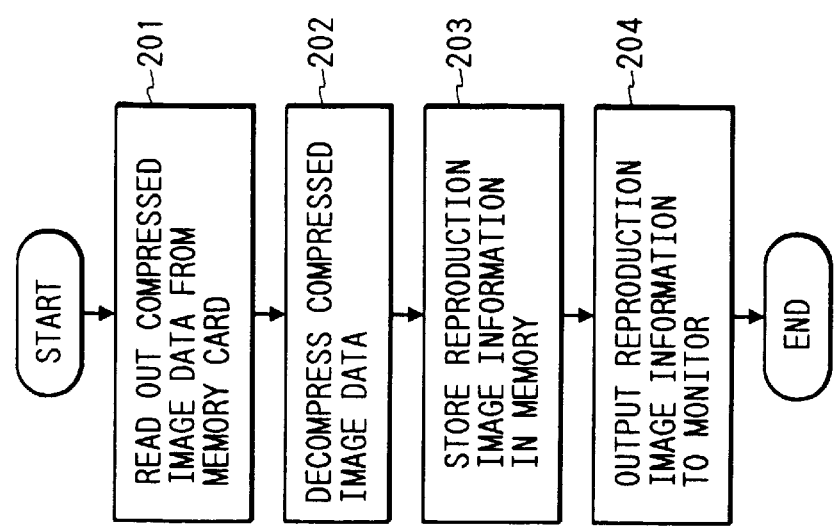
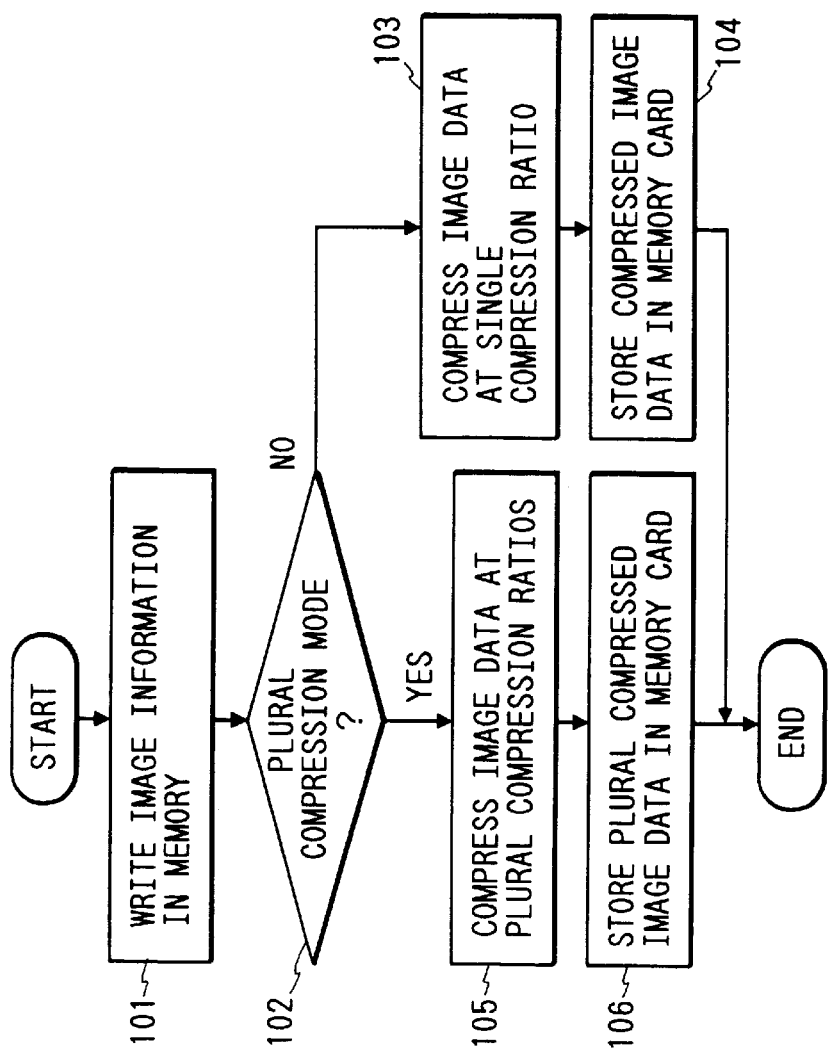

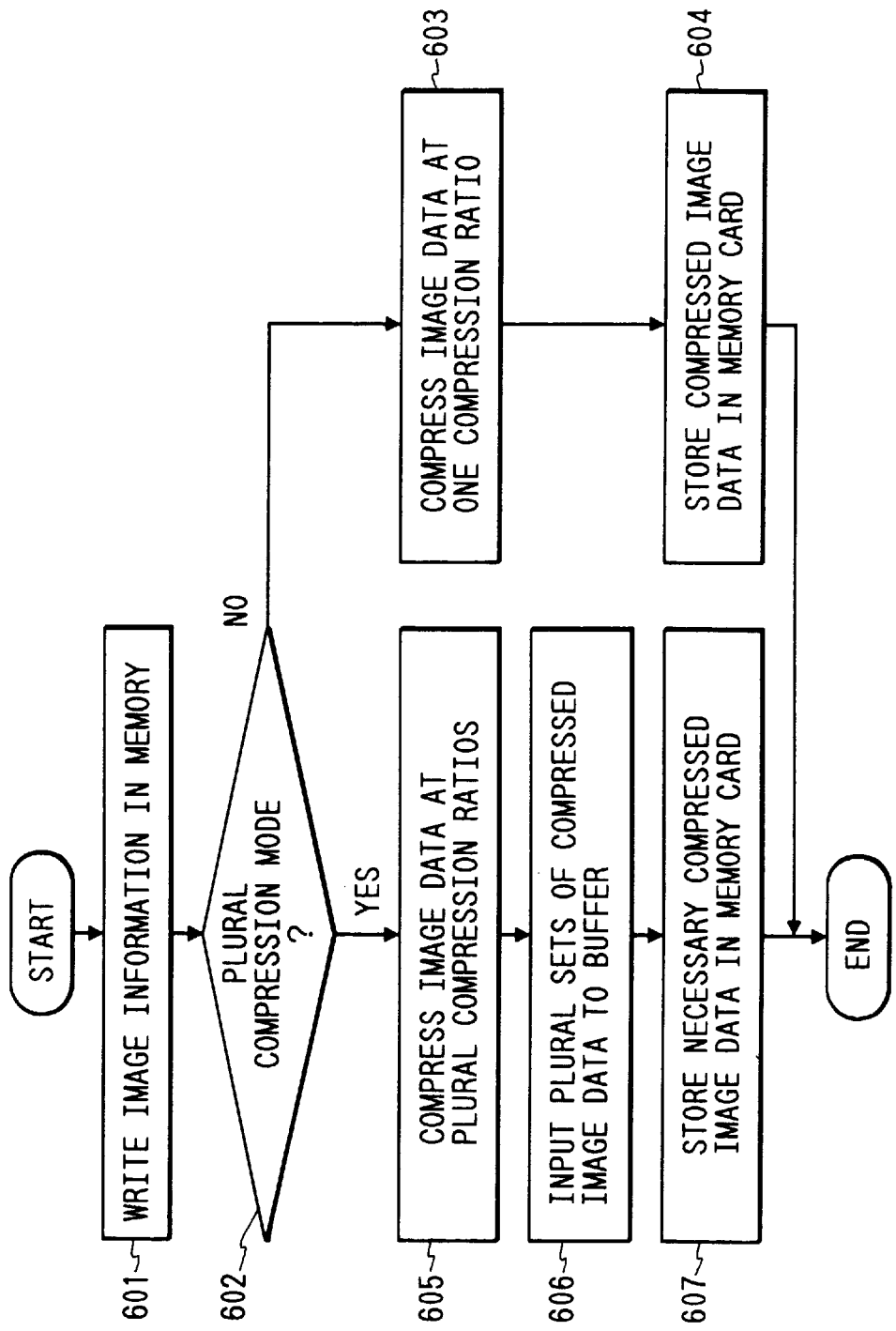

`5,821,997`

STILL IMAGE RECORDING APPARATUS WHICH SELECTIVELY COMPRESSES SINGLE IMAGE INFORMATION AT A FIRST COMPRESSION RATIO AND A SECOND COMPRESSION RATIO AND TO DECOMPRESS THE COMPRESSED SINGLE IMAGE INFORMATION FOR DISPLAY BEFORE MAIN STORAGE

This application is a continuation of application Ser. No. 08/422,769, filed Apr. 14, 1995, now abandoned, which application is a continuation of application Ser. No. 08/107,312, filed Aug. 17, 1993, entitled STILL IMAGE RECORDING APPARATUS, now abandoned.

BACKGROUND OF THE INVENTION

1. Field of the Invention

The present invention relates to a still image recording apparatus, and more particularly to a still image recording apparatus for an electronic still camera.

2. Related Background Art

In a prior art still image recording apparatus, one compression ratio is automatically or manually selected and still image information is compressed by only said selected compression ratio. The compressed image data is then stored in a recording medium. Usually, the still conventional image recording apparatus sets a large compression ratio for an image having a simple pattern, as shown in FIG. 7A, and sets a small compression ratio for an image having a complex pattern as shown in FIG. 7B. When the same image is to be compressed, the larger the compression ratio, the smaller the amount of image data.

However, when image information is to be compressed by the conventional still image recording apparatus, three steps of compression ratio are used, i.e. L, M and S. If a user sets the compression ratio to S (which is smaller than the compression ratio M) permit the storage of optimum image data, a fine pattern may be reproduced when the image data is decompressed. However, in this case, too large an area of the recording medium is used because the volume of the compressed image data increases. Hence it is not possible to compress and store many images. When the compression ratio is set to L (which is larger than M), the volume of the compressed image data is small. Thus, a smaller area of the recording medium is used and many images can be compressed and stored. However, a fine pattern is not reproduced when the image data is decompressed.

A recording apparatus which automatically selects a compression ratio has been known but a selection algorithm is difficult to design and it does not always select an optimum compression ratio to an image of any pattern. Further, since the expanded image is generally inferior in its image quality to an original image, a decision of the permissible degree of image deterioration varies with an object of use of the image and a sense of a user, whereby it is not possible to uniquely determine an optimum compression ratio for a given image.

SUMMARY OF THE INVENTION

It is an object of the present invention to provide a still image recording apparatus which provides an optimum or desired quality of image for a condition of use.

The still image recording apparatus for recording compressed image information of the present invention comprises a compression unit for compressing one image information at a plurality of different compression ratios, and a recording unit for recording a plurality of image data compressed at different compression ratios by the compression unit.

The compression unit compresses the input still image information at the plurality of different compression ratios to create a plurality of compressed image data. The recording means records the plurality of image data compressed by the compression means at the different compression ratios so that the plurality of image data of the different compression ratios derived from one image information are stored in the recording means. In the present invention, an optimum quality of an image for the condition of use and the object of use is generated from the plurality of stored image data.

BRIEF DESCRIPTION OF THE DRAWINGS

FIGS. 2A and 2B are flow charts illustrating flows of a compression operation and a decompression operation.

FIG. 6 is a flow chart illustrating a flow of a compression operation in the embodiment of FIG. 5.

DETAILED DESCRIPTION OF THE PREFERRED EMBODIMENTS

Figure 1:
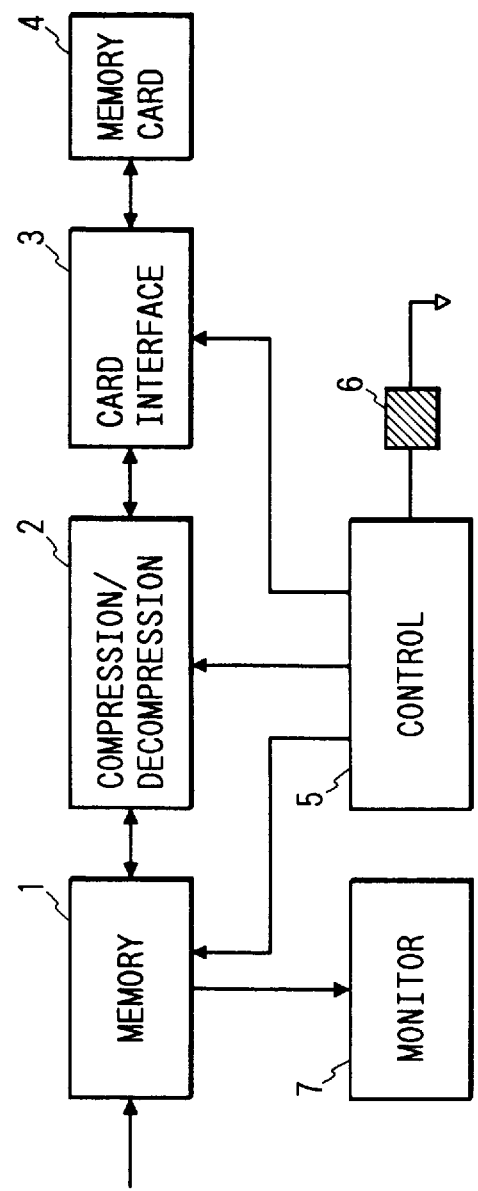
FIG. 1 is a block diagram illustrating a configuration of one embodiment of the present invention.

FIG. 1 illustrates a block diagram of an embodiment of the present invention. It comprises, as shown in FIG. 1, a memory 1 for storing image information, a compression/decompression unit 2 having compression means for compressing the stored image information to image data and decompression means for decompressing the compressed image data, a memory card 4 for storing the compressed data or a plurality of image data through a card interface 3, a control unit 5 for controlling the above units, a switch 6, and a monitor 7 for displaying an image of the decompressed image data. The switch 6 switches between a normal mode in which the image data is compressed at one compression ratio and a multi-compression mode in which the image data is compressed at a plurality of different compression ratios.

FIG. 2A shows a flow chart of a compression operation in the present embodiment, and FIG. 2B shows a flow chart of a decompression operation. In the compression operation, the image information is stored in the memory 1 in a step 101, the complexity of the image is read from the image information, and a compression ratio is set in accordance with the complexity value. In a step 102, whether the switch 6 is in the normal mode or the multi-compression mode is determined. If the switch 6 is in the normal mode in which the image data is compressed at one compression ratio, the control unit 5 controls the compression/decompression unit 2 to present one compression ratio in a step 103. The image information of the memory 1 is compressed and stored in the memory card 4 through the card interface 3 in a step 104.

On the other hand, when the switch 6 is in the multi-compression mode in which the image data is compressed at a plurality of different compression ratios, the control unit 5 controls the compression/decompression unit 2 in a step 105 to compress the image information of the memory 1 at the plurality of different compression ratios (for example, three steps L, M and S) and store the compressed information in the memory card 4 through the card interface 3.

In the reproduction operation, the image data in the memory card 4 is read through the card interface 3 in a step 201. The image data then is decompressed by the compression/decompression unit 2 in a step 202, and the reproduced image information is stored in the memory 1 in a step 203. In a step 204, the reproduced image information stored in the memory 1 is output to the external monitor 7 through a connector (not shown) to display it as a reproduced image. By sequentially displaying the reproduced images of the image data at the different compression ratios and comparing the qualities of the images, an optimum image fitting the object of use can be specified.

Unnecessary image data determined by the compression of the reproduced images may then be erased from the memory card 4 so that the waste of the area of the memory card 4 is avoided and the memory is effectively used.

Figure 3:
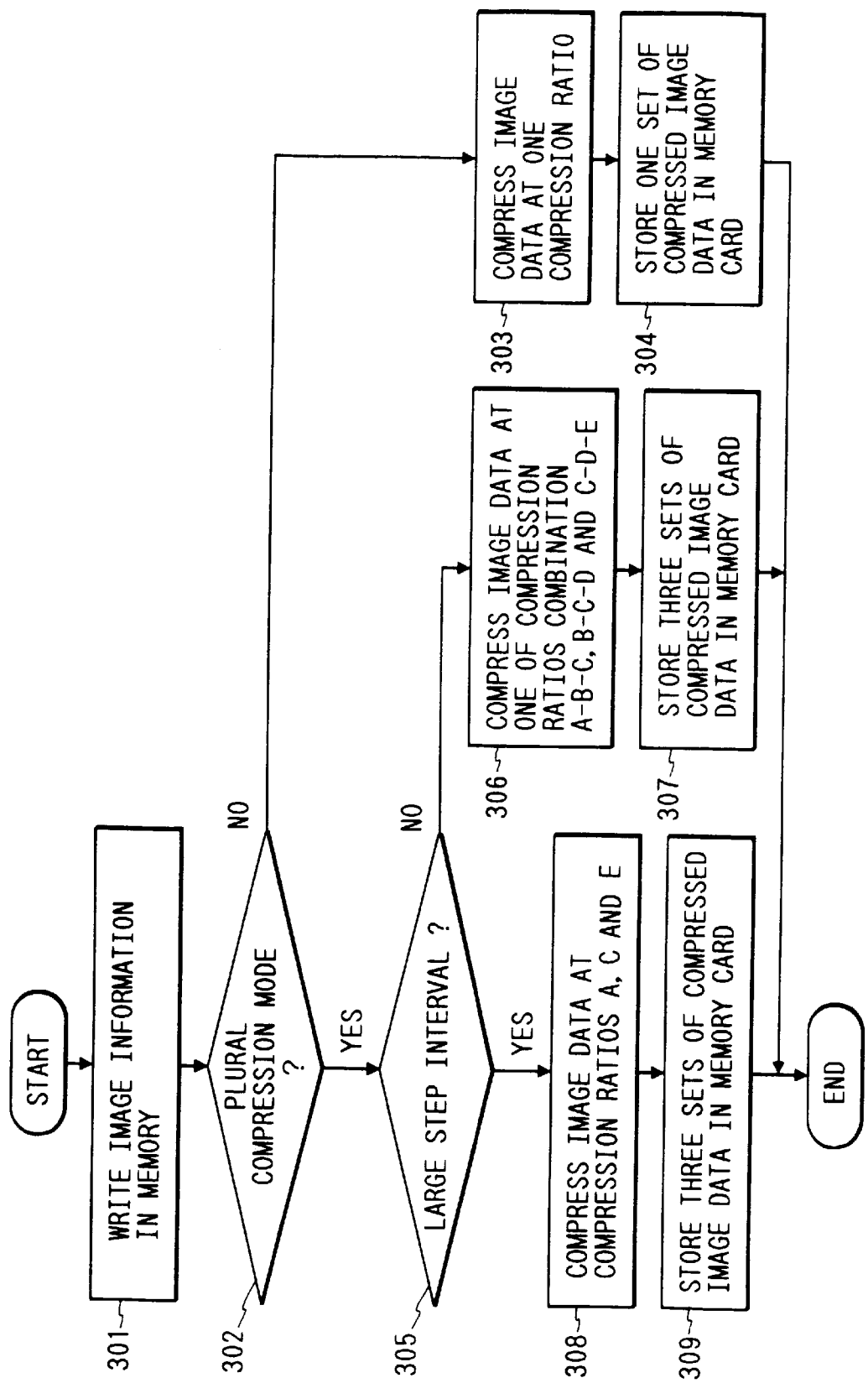
FIG. 3 is a flow chart illustrating a flow of another compression operation in the embodiment of the present invention.
Figure 4:
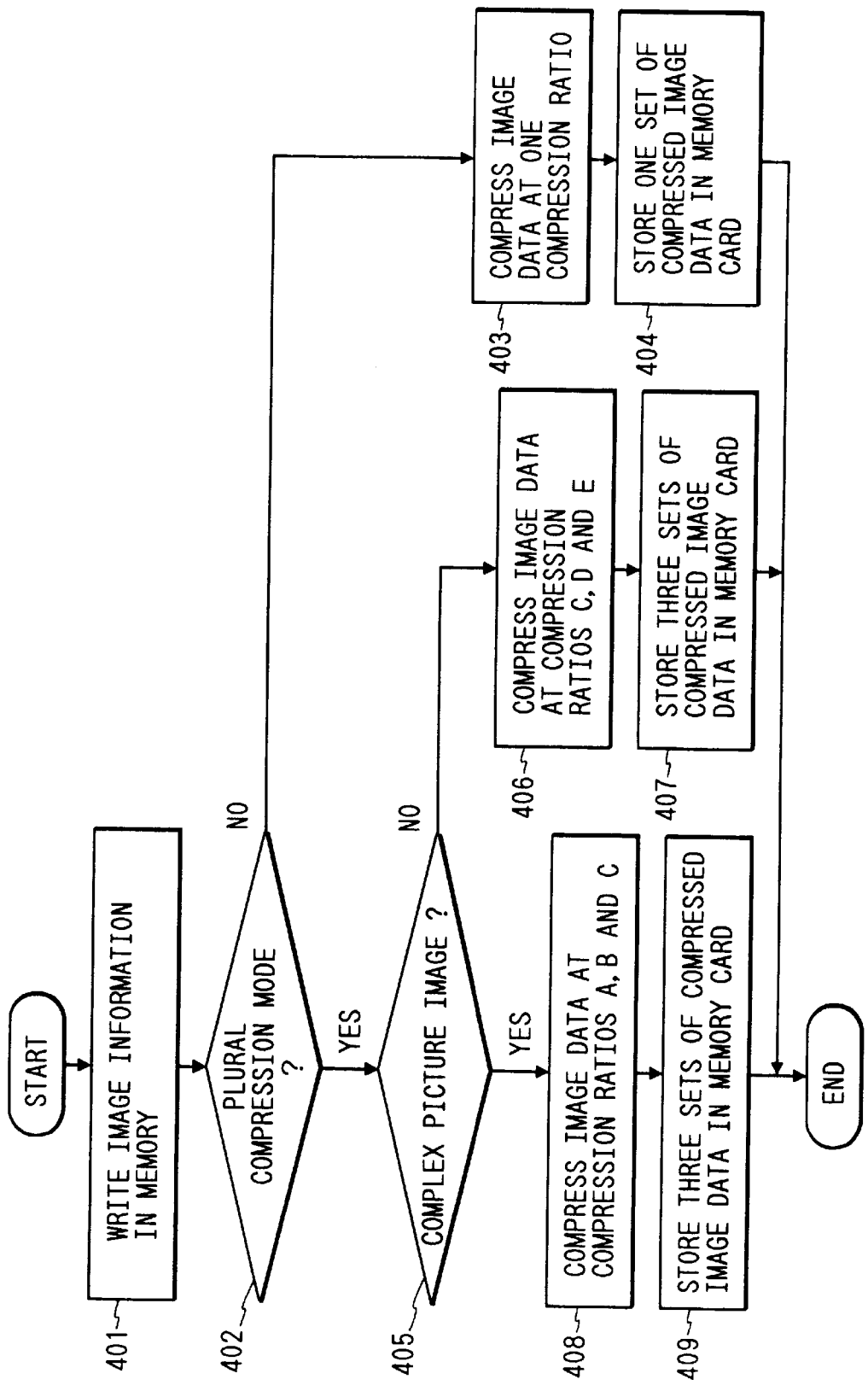
FIG. 4 is a flow chart illustrating a flow of a further compression operation in the embodiment of the present invention.

FIGS. 3 and 4 show flow charts of other flows of the compression operation in the present embodiment. These differ from the flow chart of FIG. 2A in that the number of selection branches is increased in the multi-compression mode so that the selected image approaches more closely to what the user imagines. Namely, in the compression operation of FIG. 3, selection branches are provided to permit the change of the amount of step of the compression ratio. The amount of step means an interval between different compression ratios. This is explained with reference to FIG. 3.

In FIG. 3, the image information is read in a step 301 to set one compression ratio based on the image information. In a step 302, whether the switch 6 is in the normal mode or the multi-compression mode is determined. If the switch 6 is in the normal mode in which the image data is compressed at one compression ratio, the control unit 5 controls the compression/decompression unit 2 to the preset one compression ratio in a step 303 to compress the image information of the memory 1. In a step 304, the control unit 5 stores the image information in the memory card 4 through the card interface 3. So far, the steps are same as those of FIG. 2A.

On the other hand, if the switch 6 is in the multi-compression mode in which the image data is compressed at the plurality of different compression ratios, whether the switch 6 is in the position in which the amount of step is large among the five steps of compression ratios A to E or in the position in which the amount of step is small is determined in a step 305. If the switch 6 is in the position in which the amount of step is small, the control unit 5 selects in a step 306 a combination of three adjacent compression ratios A, B, and C; B, C and D; or C, D and E from the different compression ratios A to E, and compresses at the three compression ratios. In a step 307, the image data compressed at the respective compression ratios are stored in the memory card 4 through the card interface 3.

In the step 305, if the switch 6 is in the position in which the amount of step is large, the control unit 5 compresses the image information at spaced compression ratios A, C and E of the different compression ratios A to E in a step 308. In a step 309, the control unit 5 stores the image data compressed at the respective compression ratios in the memory card 4 through the card interface 3, the reproduction operation is same as that of FIG. 2B. Where more different compression ratios than the five steps A to E are used, other combinations than those shown in the embodiment may be selected.

In a compression operation shown in FIG. 4, in the multi-compression mode, a combination of small compression ratios is automatically selected if the input image has a fine pattern, and a combination of large compression ratios is automatically selected if the input image has a coarse pattern. This is explained with reference to FIG. 4.

In FIG. 4, the image information is read in a step 401 and one compression ratio is set based on the image information. In a step 402, whether the switch 6 is in the normal mode or the multi-compression mode is determined. If the switch 6 is in the normal mode in which the image data is compressed at one compression ratio, the control unit 5 controls the compression/decompression unit 2 to the preset one compression ratio in a step 403 to compress the image information of the memory 1. In a step 404, the control unit 5 stores the image information in the memory card 4 through the card interface 3. So far, the steps are the same as those of FIGS. 2A and 3.

On the other hand, if the switch 6 is in the multi-compression mode in which the image data is compressed at the plurality of different compression ratios, whether the image has a fine pattern or not is determined in a step 405. The complexity of the image is then read in the same manner as that for setting the compression ratio. If the complexity value is smaller than a predetermined value, it is determined that the image has a fine pattern. If it is determined in the step 405 that the image has a fine pattern, the control unit 5 compresses the image information at the different compression ratios A, B and C in a step 408. In a step 409, the control unit 5 stores the image data compressed at the respective compression ratios in the memory card 4 through the card interface 3.

On the other hand, if the image does not have a fine pattern, the control unit 5 compresses the image information at the different compression ratios C, D and E in a step 406, and in a step 407, it stores the image data compressed at the respective compression ratios in the memory card 4 through the card interface 3. The reproduction operation is the same as that of FIG. 2A. Where more different compression ratios than the five steps A to B are used, other combinations than those shown in the embodiment may be selected.

In the present invention, the recording apparatus need not necessarily have the reproduction function described above, but it may be a record-only apparatus and the reproduction of the recorded image data may be done by a separate reproducing apparatus.

Figure 5:
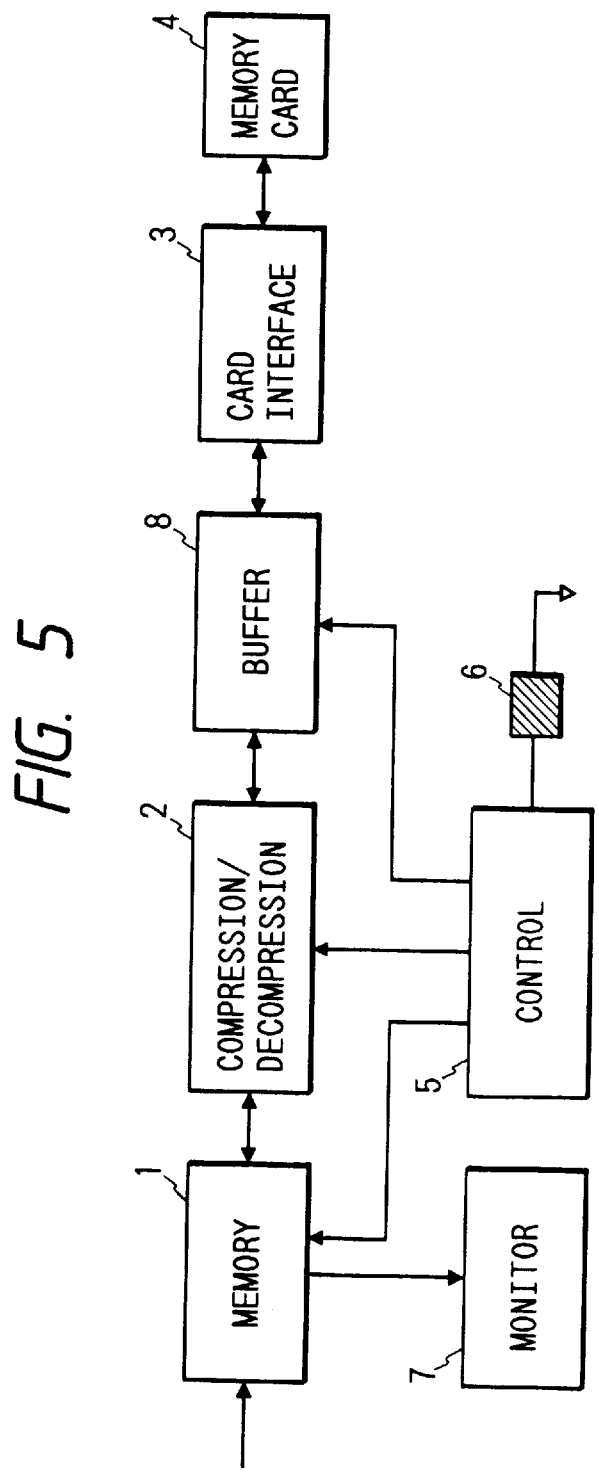
FIG. 5 is a block diagram illustrating a configuration of another embodiment of the present invention.
Figure 7A:
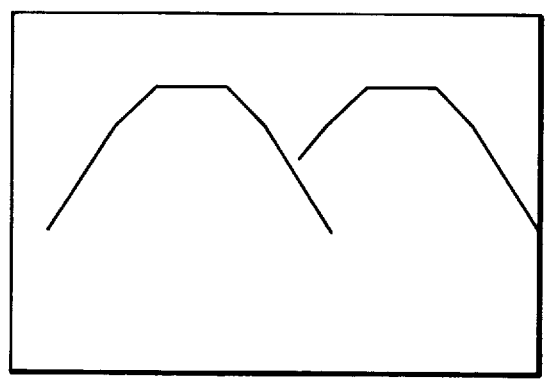
FIG. 7A (PRIOR ART) is an image of a simple pattern.
Figure 7B:
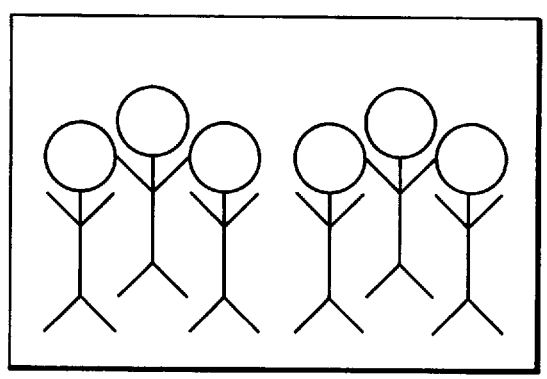
FIG. 7B (PRIOR ART) IS an image of a fine pattern.

FIG. 5 shows a block diagram of another embodiment of the present invention. It differs from the first embodiment in that a buffer memory 8 is inserted as memory means between the compression/decompression unit 2 and the card interface 3. In FIG. 5, by the addition of the buffer memory 8, a plurality of image data compressed at a plurality of different compression ratios can be temporarily stored in the buffer memory before they are stored in the memory card 4. Since the buffer memory 8 stores the compressed image data, it may be of relatively small capacity, low price, and small space. The stored plurality of image data may be output to the monitor 7 through the compression/decompression unit 2 and the memory 1 and the qualities of the reproduced images may be compared to store only the required image data in the memory card 4.

A flow of the compression operation is shown in a flow chart of FIG. 6. In FIG. 6, the image information is read into the memory 1 in a step 601. In a step 602, whether the switch 6 is in the normal mode or the multi-compression mode is determined. If the switch 6 is in the normal mode in which the image data is compressed at one preset compression ratio, the control unit 5 controls the compression/decompression unit 2 to the preset one compression ratio in a step 603. In a step 604, the control unit 5 stores the image information in the buffer memory 8 and the memory card 4 through the card interface 3.

On the other hand, if the switch 6 is in the multi-compression mode in which the image data is compressed at the plurality of different compression ratios, the control unit 5 controls the compression/decompression unit 2 to provide the plurality of different compression ratios in a step 605. In a step 606, the control unit 5 temporarily stores the plurality of image data compressed at the plurality of different compression ratios in the buffer memory 8. The stored image data may be output to the monitor 7 to compare the qualities of the reproduced images so that only the necessary image data is stored in the memory card 4 through the card interface 3 in a step 607. The reproduction operation is the same as that of the first embodiment.

In the above embodiments, the image data is stored in the memory card 4 through the card interface 3, although the recording medium is not limited to the memory card 4.

In accordance with the present invention, the plurality of image data compressed from one still image information at the plurality of different compression ratios are stored in the recording means so that the image data of the desired quality can be selected.

What is claimed is:

1. A still image recording apparatus which compresses and stores data, comprising:
    a first storage unit which stores inputted single image information;
    a compression unit which selectively compresses the single image information stored in said first storage unit; and
    a compression control unit which controls said compression unit to compresses the single image information at two compression ratios including a first compression ratio to obtain a first compressed image data and a second compression ratio which is different from the first compression ratio to obtain a second compressed image data,
    wherein said compression unit decompresses the first compressed image data into a first decompressed image data and the second compressed image data into a second decompressed image data.

2. A still image recording apparatus according to claim 1, wherein said first and second compression ratios are selectable from a plurality of predetermined compression ratios.

3. A still image recording apparatus according to claim 1, further comprising a setting unit which sets different combinations of compression ratios as said first and second compression ratios.

4. A still image recording apparatus according to claim 2, further comprising a setting unit which sets different combinations of compression ratios as said first and second compression ratios.

5. A still image recording apparatus which compresses and stores data, comprising:
    a first storage unit which stores inputted single image information;
    a compression unit which compresses said single image information stored in said first storage unit; and
    a compression control unit which controls said compression unit such that said compression unit compresses the single image information at a first compression ratio to obtain a first compressed image data and compresses said single image information at a second compression ratio which is different from the first compression ratio to obtain a second compressed image data,
    wherein said compression unit decompresses the first compressed image data into a first decompressed image data and the second compressed image data into a second decompressed image data.

6. A still image recording apparatus according to claim 3, wherein said setting unit sets the first and second compression ratios based on the inputted single image information.

7. A still image recording apparatus according to claim 4 wherein said setting unit sets the first and second compression ratios based on the inputted single image information.

8. A still image recording apparatus according to claim 5, wherein said compression control unit sets said first and second compression ratios based on the inputted single image information.

9. A still image recording apparatus according to claim 6, wherein said setting unit sets the first and second compression ratios based on the degree of complexity of the single image information.

10. A still image recording apparatus according to claim 7, wherein said setting unit sets the first and second compression ratios based on the degree of complexity of the single image information.

11. A still image recording apparatus according to claim 8, wherein said compression control unit sets said first and second compression ratios based on the degree of complexity of the single image information.

12. A still image recording apparatus according to claim 5, further comprising a switching unit which selectively sets one of a single compression ratio mode and a multi-compression ratio mode of said compression unit.

13. A still image recording apparatus comprising:
    a first image information storage unit which stores image information;
    a compression unit which compresses the stored image, said compression unit having a first mode producing single compressed image data from the stored image information and a second mode producing a plurality of different image data including first and second compressed image data from the stored image information;
    a selection unit which selects one of said first mode and said second mode;
    a compression control unit which controls said compression unit to compresses the stored image information at a first compression ratio to obtain the first compressed image data and compress the single image information at a second compression ratio which is different from the first compression ratio to obtain the second compressed image data,
    wherein said compression unit decompresses the first compressed image data into a first decompressed image data and the second compressed image data into a second decompressed image data.

14. A still image recording apparatus which compresses and stores image data, comprising:
    a data compressor which selectably compresses and decompresses inputted image information;
    a compression control unit controlling said data compressor to compress the inputted image information at a first compression ratio to obtain a first compressed image data and at a second compression ratio which is different from the first compression ratio to obtain a second compressed image data, said compression control unit further controlling said data compressor to decompress the first compressed image data into a first decompressed image data and the second compressed image data into a second decompressed image data; and a memory which collectively stores the first and second compressed image data.

15. A still image recording method, comprising the steps of:

storing inputted image information in a first storing medium;

compressing the stored image information at a first compression ratio to obtain a first compressed image data and at a second compression ratio which is different from the first compression ratio to obtain a second compressed image data; and decompressing the first compressed image data into a first decompressed image data and the second compressed image data into a second decompressed image data.

16. A still image recording apparatus which compresses and stores image information, comprising:

a first storage unit which stores inputted image information;

a compression unit which compresses the stored image information;

a compression control unit which controls said compression unit to compresses the stored image information at a first compression ratio to obtain a first compressed image data and at a second compression ratio which is different from the first compression ratio to obtain a second compressed image data; and a buffer memory which temporarily stores the first and second compressed image data, wherein said compression unit decompresses the first compressed image data into a first decompressed image data and the second compressed image data into a second decompressed image data.

17. A still image recording apparatus according to claim 16, wherein the first and second compression ratios at which said compression unit compresses are selectable from a plurality of predetermined compression ratios.

18. A still image recording apparatus according to claim 16, further comprising a setting unit which sets different combinations of compression ratios as said first and second compression ratios.

19. A still image recording apparatus according to claim 18, wherein said setting unit sets said first and second compression ratios based on the image data.

20. A still image recording apparatus according to claim 19, wherein said setting unit sets said first and second compression ratios based on the degree of complexity of the image.

21. A still image recording method to compress and store image data, comprising the steps of:

storing inputted image information;

compressing said stored image information at a plurality of different compression ratios A, B, and C, if the store information corresponds to a fine picture and compressing the stored image information at a plurality of different compression ratios C, D and E, if the store information corresponds to a coarse picture, wherein the compression ratios A, B, C, D, and E sequentially vary from small to large thereby producing a plurality of different image data from the stored image information;

storing the image data compressed at the different compression ratios in a buffer memory;

decompressing each of the image data compressed at the different compression ratios;

selecting a one of said compression ratios; and storing in a main memory compressed image information corresponding to the selected one of said compression ratios.

22. A still image recording apparatus comprising:

a compression unit which compresses single image information at a first compression ratio to obtain a first compressed image data and compresses said single image information at a second compression ratio which is different from the first compression ratio to obtain a second compressed image data;

a buffer memory which temporarily stores the first and second compressed image data produced by said compression unit;

a reproduction unit which reproduces the image data stored in said buffer memory; and a main memory which selectively stores one of the plurality of image data stored in said buffer memory, wherein said compression unit decompresses the first compressed image data into a first decompressed image data and the second compressed image data into a second decompressed image data.

23. A still image recording system comprising:

a compression unit which compresses single image information at a first compression ratio to obtain a first compressed image data and compresses said single image information at a second compression ratio which is different from the first compression ratio to obtain a second compressed image data;

a buffer memory which temporarily stores the first and second compressed image data produced by said compression unit;

a monitor which reproduces the image data stored in said buffer memory as a visible image; and a main memory which selectively stores one of the first and second compressed image data stored in said buffer memory, wherein said compression unit decompresses the first compressed image data into a first decompressed image data and the second compressed image data into a second decompressed image data.

24. A still image recording method, comprising the steps of:

compressing inputted image information at a first compression ratio to obtain a first compressed image data and compressing said single image information at a second compression ratio which is different from the first compression ratio to obtain a second compressed image data;

temporarily storing the first and second compressed image data in a buffer memory;

decompressing the first and second compressed image data respectively into first and second decompressed image data;

displaying the first and second decompressed image data as a visible image on a monitor;

entering a determination whether the visible image displayed on said monitor should be stored in a main memory; and selectively storing the image data corresponding to the visible image which was determined to be stored in said main memory from said buffer memory.

25. A still image recording apparatus, comprising:

a switch to select a single compression mode, a multi-compression mode having a large step or a multi-compression mode having a small step;

a first storage unit to store single image information;

a compression unit to selectively compress the single image information with a single compression ratio, a plurality of spaced compression ratios or a plurality of adjacent compression ratios; and a compression control unit to control said compression unit to compresses the single image information at the single compression ratio if said switch selects the single compression mode, the plurality of spaced compression ratios if said switch selects the multi-compression mode having a large step, or the plurality of adjacent compression ratios if said switch selects the multi-compression mode having a small step and to control said compression unit to decompress a plurality of the selectively compressed image information.

26. An apparatus, comprising:

a data compressor which compresses and decompresses still image information;

a compression control unit which selects a combination of three adjacent compression ratios A, B, and C; B, C, and D; and C, D, and E; and which controls said data compressor to compress the image information at the selected combination of adjacent compression ratios to produce first compressed image data and second compressed image data from the image information;

a memory which stores the first and second image data; and a decompression control unit to decompress the first compressed image data and the second compressed image data.

* * * * *

UNITED STATES PATENT AND TRADEMARK OFFICE
CERTIFICATE OF CORRECTION

PATENT NO.: 5,821,997
DATED : October 13, 1998
INVENTOR(S): Koichiro KAWAMURA, et al.

It is certified that error appears in the above-identified patent and that said Letters Patent is hereby corrected as shown below:

Column 6, line 39, (claim 13), after "image" insert --information--.

Column 7, line 59, (claim 21), change "store" to --stored--.

Signed and Sealed this

Ninth Day of February, 1999

Attest:

*Attesting Officer*

*Acting Commissioner of Patents and Trademarks*